United States Patent [19]

Lohrenz et al.

[11] Patent Number: 5,719,790
[45] Date of Patent: Feb. 17, 1998

[54] METHOD AND CIRCUIT CONFIGURATION FOR COMPENSATING FOR SIGNAL ERRORS OF A YAW VELOCITY SENSOR

[75] Inventors: Frank Lohrenz; Frank Menten, both of Regensburg; Gregor Probst, Landshut, all of Germany

[73] Assignee: Siemens Aktiengesellschaft, Munich, Germany

[21] Appl. No.: 594,266

[22] Filed: Jan. 30, 1996

[30] Foreign Application Priority Data

Jan. 30, 1995 [DE] Germany .................. 195 02 858.9

[51] Int. Cl.⁶ .................. B60G 17/01; A01G 25/00
[52] U.S. Cl. ............ 364/571.03; 364/565; 364/424.06; 364/571.01
[58] Field of Search .............. 364/571.03, 424.05, 364/426.03, 426.02, 426.01, 424.1, 565; 73/1 D, 516 LM; 280/707, 772

[56] References Cited

U.S. PATENT DOCUMENTS

| | | | |
|---|---|---|---|
| 5,001,636 | 3/1991 | Shiraishi et al. | 364/424.05 |
| 5,102,162 | 4/1992 | Okuda et al. | 364/424.05 |
| 5,270,960 | 12/1993 | Ikegami et al. | 364/571.03 |
| 5,274,576 | 12/1993 | Williams | 364/424.05 |
| 5,321,616 | 6/1994 | Okuda et al. | 364/424.05 |
| 5,333,058 | 7/1994 | Shiraishi et al. | 364/424.05 |
| 5,388,658 | 2/1995 | Ando et al. | 364/426.03 |
| 5,502,639 | 3/1996 | Fukunaga et al. | 364/424.05 |
| 5,524,079 | 6/1996 | Ishida et al. | 364/424.05 |

FOREIGN PATENT DOCUMENTS

| | | |
|---|---|---|
| 3919347 | 2/1990 | Germany . |
| 3212611 | 3/1991 | Germany . |
| 4123234 | 8/1992 | Germany . |
| 4228893 | 3/1994 | Germany . |
| 4340719A1 | 6/1995 | Germany . |

*Primary Examiner*—Emanuel T. Voeltz
*Assistant Examiner*—Hien Vo
*Attorney, Agent, or Firm*—Herbert L. Lerner; Laurence A. Greenberg

[57] ABSTRACT

A method and a circuit configuration for compensating for signal errors of a yaw velocity sensor used in regulating driving stability of a motor vehicle include ascertaining a driving state in which an offset of a yaw velocity sensor is unequivocally determinable from electrical signals of at least one of a steering wheel angle sensor, wheel speed sensors and a transverse acceleration sensor, ascertaining the offset from the signals of one of the sensors in the driving state, and calculating a yaw velocity from the electrical signals of at least one of the sensors. Driving states are ascertained at a beginning and at an end of a predetermined time interval in which the yaw velocities of the motor vehicle are unequivocally determinable and differ from one another, the yaw velocities are calculated and associated signal voltages of the yaw velocity sensor are fixed at those instants. A sensitivity is calculated from the calculated yaw velocities and the associated signal voltages of the yaw velocity sensor. Various values of the offset and sensitivity are associated with one another in pairs from a functional dependency of the offset and the sensitivity on the temperature and stored in memory. The offset and sensitivity errors of the yaw velocity sensor are compensated for with the stored values.

4 Claims, 3 Drawing Sheets

METHOD AND CIRCUIT CONFIGURATION FOR COMPENSATING FOR SIGNAL ERRORS OF A YAW VELOCITY SENSOR

BACKGROUND OF THE INVENTION

Field of the Invention

The invention relates to a method for compensating for signal errors of a sensor in a motor vehicle, in particular of a yaw velocity sensor used in regulating driving stability of a motor vehicle, in which a driving state in which the offset of the yaw velocity sensor is unequivocally determinable is ascertained from electrical signals of a steering wheel angle sensor, wheel speed sensors or a transverse acceleration sensor, and the offset is ascertained from the signals of one of those sensors in that driving state, and the yaw velocity is calculated from the electrical signals of at least one of those sensors. The invention also relates to a circuit configuration for compensating for the signal errors of a sensor in a motor vehicle, in particular of a yaw velocity sensor used for regulating driving stability in a motor vehicle, having a control unit that evaluates signals of a plurality of sensors and having a memory that receives ascertained values, wherein a driving state in which the offset of the yaw velocity sensor is unequivocally determinable is ascertained in the control unit from electrical signals of a steering wheel angle sensor, wheel speed sensors or a transverse acceleration sensor, and the offset is ascertained in that driving state from the signals of one of those sensors, and the yaw velocity is calculated from the electrical signals of at least one of those sensors.

Such a method for compensating for the signal errors of a yaw velocity sensor is employed, for instance, for regulating driving stability in a motor vehicle. The signals of the yaw velocity sensor are evaluated and a yawing motion, that is a rotation about the vertical axis of the vehicle that has not been intentionally caused by the driver, is counteracted, for instance by purposeful braking interventions.

The signals furnished by sensors are falsified by parasitic induction, such as the temperature of the sensor or the mounting of the sensor materials. In order to obtain an accurate outcome of a measurement, the signal errors caused by this parasitic induction must be compensated for. In a known driving dynamics control that includes a yaw velocity sensor among other elements, the ambient temperature is detected by a temperature sensor, and the temperature dependency of the sensor characteristic curves is taken into account in one or more evaluation units (German Published, Non-Prosecuted Patent Application DE 42 28 893 A1). A circuit configuration for evaluating the signals of a yaw velocity sensor, in which the temperature dependency of the sensor signals is compensated for with the aid of temperature, is known from German Published, Non-Prosecuted Patent Application DE 43 40 719 A1. A method for temperature compensation of a sensor signal also requires a temperature sensor.

SUMMARY OF THE INVENTION

It is accordingly an object of the invention to provide a method and a circuit configuration for compensating for signal errors of a yaw velocity sensor, which overcome the hereinafore-mentioned disadvantages of the heretofore-known methods and devices of this general type and which permit signal errors of a sensor caused by parasitic induction to be compensated for without additional expense for circuitry.

With the foregoing and other objects in view there is provided, in accordance with the invention, in a method for compensating for signal errors of a sensor in a motor vehicle, in particular for a yaw velocity sensor used in regulating driving stability of a motor vehicle, which includes ascertaining a driving state in which an offset of a yaw velocity sensor is unequivocally determinable from electrical signals of at least one of a steering wheel angle sensor, wheel speed sensors and a transverse acceleration sensor, and ascertaining the offset from the signals of one of the sensors in the driving state; and calculating a yaw velocity from the electrical signals of at least one of the sensors, the improvement which comprises ascertaining driving states at a beginning and at an end of a predetermined time interval in which the yaw velocities of the motor vehicle are unequivocally determinable and differ from one another, and calculating the yaw velocities and fixing associated signal voltages of the yaw velocity sensor at those instants; calculating a sensitivity from the calculated yaw velocities and the associated signal voltages of the yaw velocity sensor; associating various values of the offset and sensitivity with one another in pairs from a functional dependency of the offset and the sensitivity on the temperature, and storing the associated values in memory; and compensating for the offset and sensitivity errors of the yaw velocity sensor with the stored values.

In accordance with another mode of the invention, there is provided a method which comprises ascertaining the offset by a long-term filtering between driving states in which the offset of the yaw velocity sensor is unequivocally determinable.

In accordance with a further mode of the invention, there is provided a method which comprises compensating for at least one of the sensitivity and the offset of the yaw velocity sensor by computation.

In accordance with an added mode of the invention, there is provided a method which comprises calculating the sensitivity of the yaw velocity sensor by the formula:

$$E = \frac{\Psi_{ref1} - \Psi_{ref2}}{U_1 - U_2}$$

in which $\Psi_{ref1}$ and $\Psi_{ref2}$ are the yaw velocities calculated at two instants, and $U_1$ and $U_2$, are the associated signal voltages of the yaw velocity sensor.

In accordance with an additional mode of the invention, there is provided a method which comprises ascertaining each of the offset and the sensitivity of the yaw velocity sensor during one classified driving state.

With the objects of the invention in view, there is also provided a circuit configuration for compensating for signal errors of a sensor in a motor vehicle, in particular for a yaw velocity sensor used for regulating driving stability in a motor vehicle, comprising a steering wheel angle sensor, wheel speed sensors or a transverse acceleration sensor supplying electrical signals; a memory for receiving ascertained values; and a control unit evaluating the signals of the sensors and being programmed to ascertain a driving state in which an offset of the yaw velocity sensor is unequivocally determinable from the electrical signals of the sensors, and ascertain the offset from the signals of one of the sensors in the driving state; calculate a yaw velocity from the electrical signals of at least one of the sensors; ascertain driving states at a beginning and at an end of a predetermined time interval in which the yaw velocities of the motor vehicle are unequivocally determinable and differ from one another, and calculate the yaw velocities at those instants from the electrical signals of one of the sensors and fix associated signal voltages of the yaw velocity sensor; calculate a sensitivity from the calculated yaw velocities and the associated signal voltages of the yaw velocity sensor; associate various values of the offset and sensitivity with one another in pairs from a functional dependency of the offset and the sensitivity on the temperature, and store the associated values in the memory; and compensate for the offset and sensitivity errors of the yaw velocity sensor with the memorized values.

In accordance with a concomitant feature of the invention, the control unit includes an algorithm for calculating reference yaw rates and an algorithm for ascertaining and compensating for the offset and the sensitivity of the yaw velocity sensor.

The advantages of the invention reside particularly in the fact that the expense of a temperature sensor can be saved, and that moreover other kinds of parasitic induction, such as those caused by sensor aging, can also be taken into account.

Other features which are considered as characteristic for the invention are set forth in the appended claims.

Although the invention is illustrated and described herein as embodied in a method and a circuit configuration for compensating for signal errors of a yaw velocity sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
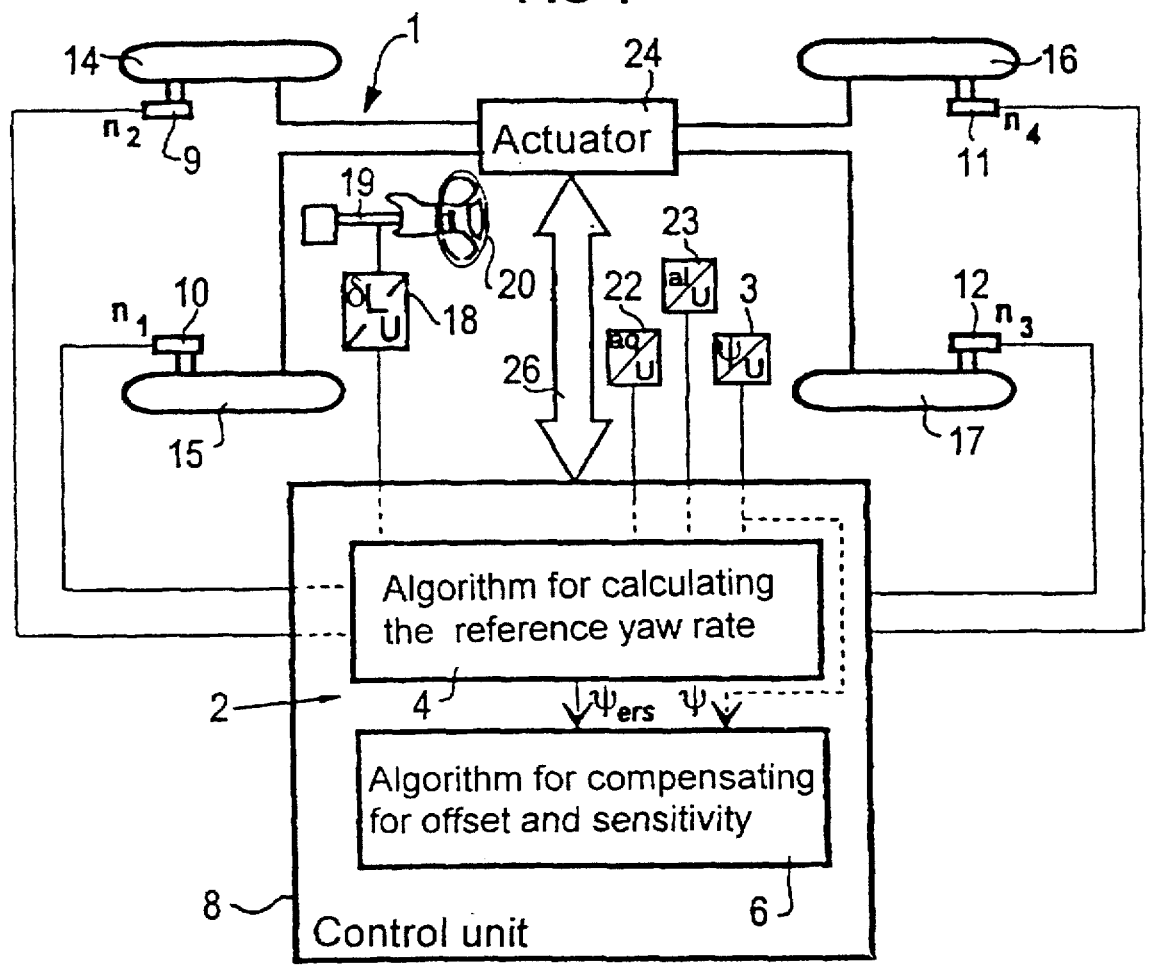
FIG. 1 is a block circuit diagram of a motor vehicle having a control unit with which the method of the invention is carried out.

Referring now to the figures of the drawing in detail and first, particularly, to FIG. 1 thereof, there is seen a motor vehicle 1 which includes a circuit configuration 2 for compensating for signal errors of a yaw velocity sensor 3. The circuit configuration 2 is, for example, constructed as a known microcomputer, which includes a calculation algorithm 4 for calculating a reference yaw rate and an algorithm 6 for ascertaining an offset and sensitivity of the yaw rate sensor 3 and which executes these algorithms, as will be described below. In this case, instead of the actually appropriate term "yaw velocity", the shorter and by now often-used term "yaw rate" will be used.

The circuit configuration 2 is a component of an electronic control unit 8 which, by way of example, may be an ABS, ASR (traction control) or FSR (driving stability regulation) control unit, in which the signals furnished by the yaw rate sensor 3 and other sensors are evaluated and used for open-loop and closed-loop control of a drive of the motor vehicle 1. Four wheel speed sensors 9–12 measure wheel speeds $n_1$–$n_4$ of four wheels 14–17 of the motor vehicle 1.

Other sensors are connected to the control unit 8 and the circuit configuration 2 as follows: a steering wheel angle sensor 18 which is connected to a steering column 19 and measures an angle of rotation of a steering wheel 20, optionally a transverse acceleration sensor 22, and a longitudinal acceleration sensor 23.

The control unit 8 receives data from an actuator 24 and sends control commands to the actuator 24. The control unit 8 is connected to the actuator 24 over a bidirectional data line 26 which is constructed as a bus, for instance, and is represented as a wide arrow in the drawing. The actuator 24 is connected to the four wheels 14–17 through pressure lines which are shown in the drawing as heavy lines, so that it controls brake pressure for each of the wheels individually, and specifically in whatever way the particular function (ABS, ASR, etc.) requires.

The sensors shown in FIG. 1 are connected to the control unit 8 by signal lines which are shown as fine lines in the drawing.

Figure 2:
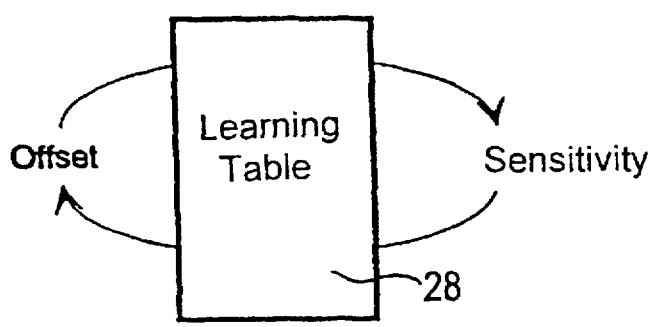
FIG. 2 is a symbolic illustration of a key concept of the invention.

A basic concept of the invention will be explained below in conjunction with FIG. 2. If the offset of the yaw rate sensor 3, that is the zero point ordinate or deviation of the yaw rate sensor signal from the voltage value of zero, is ascertained in any arbitrary way when yawing motion is not present, then a conclusion about the sensitivity of the yaw rate sensor 3 can be drawn from the functional dependency of the sensitivity on the temperature, which is stored in a memory 28 in the form of a table. Conversely, in the event of a sensitivity which is ascertained in any arbitrary way, a conclusion as to the offset of the yaw rate sensor can be drawn through a dependency of the offset on the temperature, which is likewise stored in the form of a table in the memory 28. The information stored in the table can be "learned" by the control unit itself, or in other words ascertained by trial and error, stored in memory, and adaptively improved. The learning process will be described below in conjunction with FIG. 3.

The following driving situations are, for instance, used to determine the offset and then to compensate for the offset and the sensitivity ascertained from the offset through the temperature:

A. Constant longitudinal dynamics during a driving cycle: The steering wheel angle is monitored within a predetermined time interval for its match with the value of zero, with a certain range of tolerance being allowed, and the offset value of the sensor signal is ascertained in the process.

If the motor vehicle has a transverse acceleration signal, then the measured transverse acceleration within a predetermined time interval is monitored for its match with the value of zero, a certain tolerance such as 0.05 g, for example, is allowed, and in the process the offset value of the yaw rate sensor is ascertained.

B. Non-motion of the motor vehicle within a driving cycle: The four wheel speeds furnished by the sensors 9–12 are monitored within a predetermined time interval for their match with the value zero, with a certain range of tolerance being allowed, and in the process the offset value of the yaw rate sensor is ascertained. When the time interval is defined, the backlash time of the motor vehicle and the possible duration of locking at all four wheels during a braking operation must be taken into account.

Between the above-described driving states, in which the offset of the yaw rate sensor can be ascertained directly, the offset values are ascertained through long-term filtering (filtering with a high-pass filter) using one of the generally known filtering methods. In order to ascertain the sensitivity and for the ensuing compensation of the sensitivity and offset through the temperature ascertained from the sensitivity of the yaw rate sensor, driving situations described below are utilized:

The sensitivity is calculated by the following formula:

$$E = \frac{\Psi_{ref1} - \Psi_{ref2}}{U_1 - U_2}$$

At a beginning $t_1$ and an end $t_2$ of a predetermined time interval $\Delta t = t_2 - t_1$, a reference yaw rate $\Psi_{ref1}$, $\Psi_{ref2}$ is ascertained for each, and associated signal voltages $U_1$ and $U_2$ of the yaw rate sensor 3 are measured. A yaw rate that is calculated in a known manner from the signals of other sensors besides the yaw rate sensor, for instance from the signals of the steering wheel angle sensor 18 and the wheel speed sensors 9–12 or the transverse acceleration sensor 22, is referred to as the reference yaw rate herein. In order to determine the reference yaw rates, two driving states must be selected at times $t_2$ and $t_1$. In the two driving states on one hand the yaw rate can be unequivocally determined and on the other hand the values of the yaw rates are different from one another. Such driving states are, for instance, as noted, driving straight ahead and cornering with low transverse acceleration (for instance, $\leq 0.4$ g).

Figure 3A:
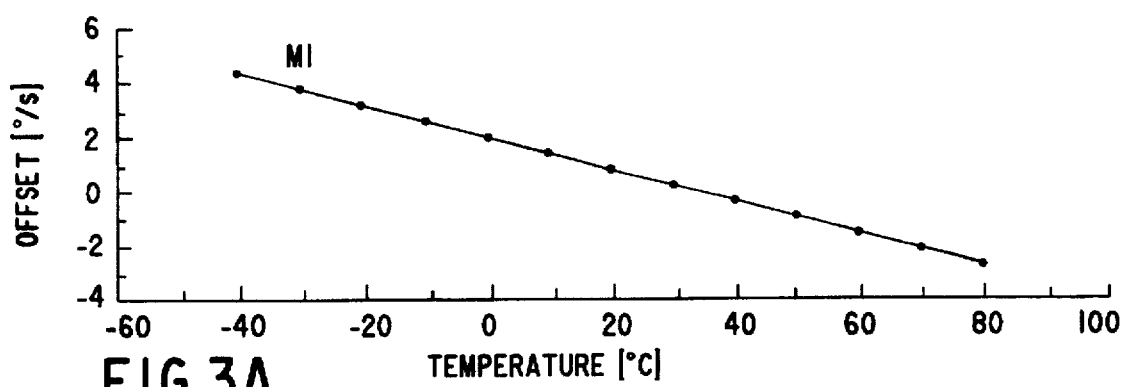
FIG. 3 includes graphical illustrations of a functional dependency of an offset and sensitivity of a yaw rate sensor on temperature.
Figure 3B:
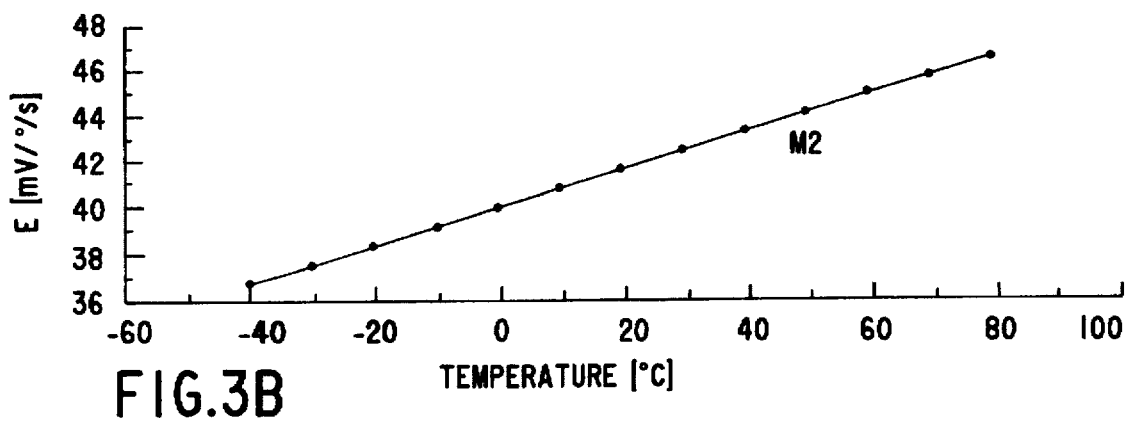

Between the offset and the sensitivity of the yaw rate sensor on one hand and the temperature on the other hand, either linear or nonlinear functional dependencies can exist. In FIG. 3, the instance of a linear dependency between the temperature and the offset (upper diagram) and a linear dependency between the temperature and the sensitivity (lower diagram) is shown.

If a measurement M1 is used to ascertain the offset in a driving state in which it is unequivocally determinable, then the associated sensitivity of the yaw rate sensor can be read off directly through the temperature, as is illustrated in FIG. 3 by a left-hand, downward-pointing arrow shown in a solid line. If conversely the sensitivity is ascertained in a driving state in which it is unequivocally determinable through the use of a measurement M2, then the associated offset value of the yaw rate sensor can again be read off directly (right-hand, upward-pointing arrow shown in dashed lines in FIG. 3) through the temperature.

Figure 4:
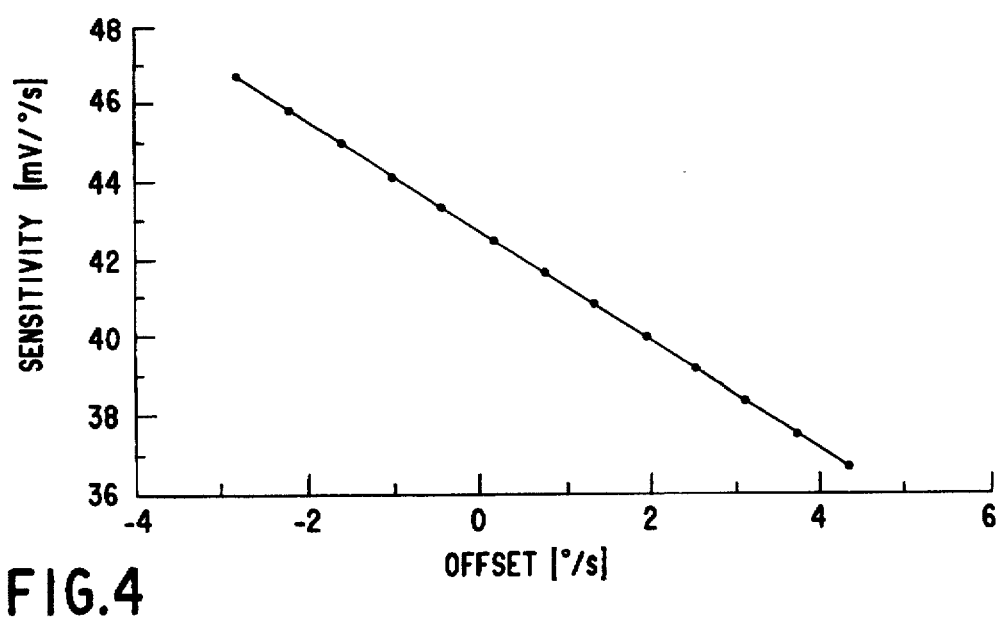
FIG. 4 is a graphical illustration of a functional dependency of sensitivity on an offset of a yaw rate sensor.

Due to this unequivocal relationship between the two sensor parameters, the sensitivity can also be plotted directly through the offset of the yaw rate sensor shown in FIG. 4. This relationship is stored in the table in the memory 28 in the form of support point coordinates, which are represented by dots in FIG. 4. The values between these support points are interpolated by computation.

If there is a linear dependency between the temperature and the offset of a yaw rate sensor but a nonlinear dependency between the temperature and the sensitivity, then the associated sensitivity can again be ascertained from a measured offset value, through the temperature. If the dependency of the sensitivity on the temperature is a function that does not rise or fall monotonously, then it is not possible to associate an unequivocal temperature and therefore an unequivocal offset value with a sensitivity that is calculated in a suitable driving state. The situation is the same but vice versa, for the case of linear dependency between the sensitivity and the non-linear dependency between the offset and the temperature. Finally, if both parameters are nonlinear and are not monotonously dependent on the temperature, then the method of the invention does not produce unequivocal relationships.

Figure 5:
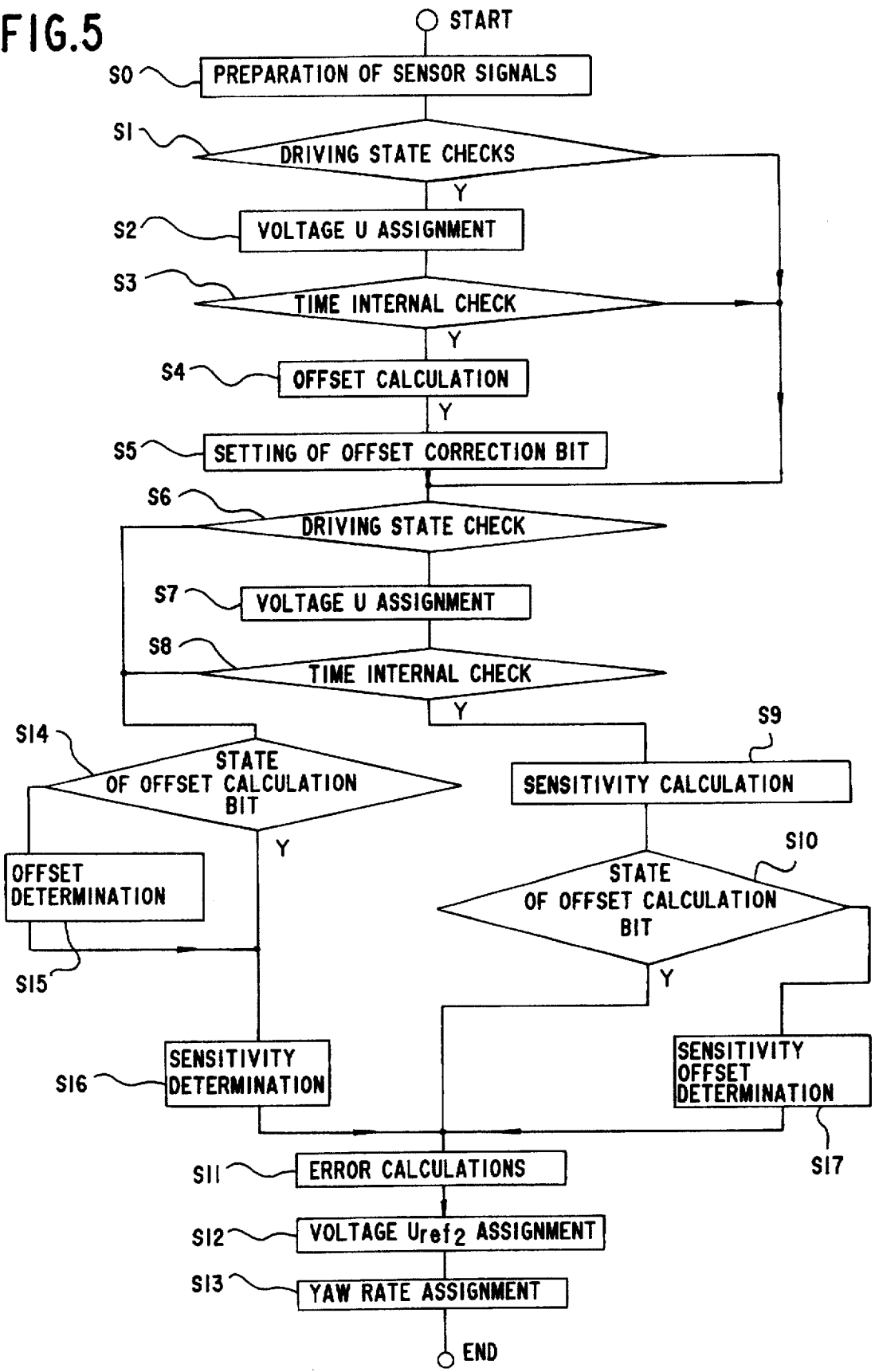
FIG. 5 is a flowchart which represents a calculation program to be worked through in the method of the invention.

The method of the invention is carried out in the control unit 8 by working through a program as shown in the flowchart of FIG. 5. The following program steps are carried out:

In a step S0: The sensor signals are written in and prepared, for instance by being filtered. The current time t is assigned to the variable $t_2$.

In a step S1A: It is ascertained if a driving state from which a direct conclusion about the offset can be drawn is present (for instance, the vehicle is at a stop).

In a step S1B: The current offset is calculated, and an offset calculation bit is set to the value "true".

In a step S1: A check is made as to whether or not a driving state from which the offset can be determined by calculating a reference yaw rate is present. If the answer is "no", then a jump is made to a step S6.

In a step S2: The written-in voltage U is assigned to the variable $U_{ref2}$. The reference yaw rate is calculated.

In a step S3: A check is made as to whether or not a predetermined time interval $\Delta t \geq t_2 - t_1$ has been adhered to. If the answer is "no", then a jump is made to the step S6.

In a step S4: The offset is calculated from the values $U_{oeξ2}$, $\Psi_{ref2}$ and a valid sensitivity value E.

In a step S5: The offset correction bit is set to "true". The time $t_2$ is stored under the variable $t_1$.

In the step S6: A check is made as to whether or not a driving state in which the sensitivity can be determined is present, that is in which a reference yaw rate can be calculated for determining the sensitivity.

In a step S7: The written-in voltage U is assigned to the variable $U_{ref2}$. The reference yaw rate is calculated.

In a step S8: A check is made as to whether or not a predetermined time interval $\Delta t_2 \geq t_2 - t_3$ has been adhered to. If the answer is "no", then a jump is made to a step S14.

In a step S9: The sensitivity is calculated from $U_{ref2}$, $\Psi_{ref2}$ and $U_{ref1}$, $\Psi_{ref1}$. The time $t_3$ is assigned to the variable $t_2$.

In a step S10: The question is asked whether or not the offset calculation bit has been set to "true". If the answer is "no", then a jump to a step S17 takes place.

In a step S11: The errors in offset and sensitivity are calculated.

In a step S12: The voltage $U_{ref2}$ is assigned to the variable $U_{ref1}$.

In a step S13: The yaw rate $\Psi_{ref2}$ is assigned to the variable $\Psi_{ref1}$.

In the step S14: The question is asked whether or not the offset calculation bit has been set to "true". If the answer is "no", then a jump to a step S15 takes place.

In the step S15: The offset is determined with long-term filtering (high-pass filter).

In a step S16: The sensitivity is determined from the ascertained offset (by interpolation of the tables stored in the memory 28).

In the step S17: The offset is determined from the ascertained sensitivity (by interpolation of the tables stored in the memory 28).

Thus the offset of the yaw velocity sensor 3 can be compensated for, or its sensitivity adjusted, at any time, without requiring a temperature sensor for that purpose.

We claim:

1. In a method for compensating for signal errors of a yaw velocity sensor used in regulating driving stability of a motor vehicle, which includes:

ascertaining a driving state in which an offset of a yaw velocity sensor is unequivocally determinable from electrical signals of at least one of a steering wheel angle sensor, wheel speed sensors and a transverse acceleration sensor, and ascertaining the offset from the signals of one of the sensors in the driving state; and calculating a yaw velocity from the electrical signals of at least one of the sensors, the improvement which comprises:

ascertaining driving states at a beginning and at an end of a predetermined time interval in which the yaw velocities of the motor vehicle are unequivocally determinable and differ from one another, and calculating the yaw velocities and fixing associated signal voltages of the yaw velocity sensor at those instants;

calculating a sensitivity from the calculated yaw velocities and the associated signal voltages of the yaw velocity sensor by the formula:

$$E = \frac{\Psi_{ref1} - \Psi_{ref2}}{U_1 - U_2}$$

in which $\Psi_{ref1}$ and $\Psi_{ref2}$ are the yaw velocities calculated at two instants, and $U_1$ and $U_2$, are the associated signal voltages of the yaw velocity sensor;

associating various values of the offset and sensitivity with one another in pairs from a functional dependency of the offset and the sensitivity on the temperature, and storing the associated values in memory; and compensating for the offset and sensitivity errors of the yaw velocity sensor with the stored values.

2. The method according to claim 1, which comprises ascertaining the offset by a long-term filtering between driving states in which the offset of the yaw velocity sensor is unequivocally determinable.

3. The method according to claim 1, which comprises compensating for at least one of the sensitivity and the offset of the yaw velocity sensor by computation.

4. The method according to claim 1, which comprises ascertaining each of the offset and the sensitivity of the yaw velocity sensor during one classified driving state.

* * * * *